United States Patent
Takasaka et al.

(10) Patent No.: US 12,248,171 B2
(45) Date of Patent: Mar. 11, 2025

(54) MULTI-CORE OPTICAL AMPLIFYING FIBER, MULTI-CORE OPTICAL FIBER AMPLIFIER, AND OPTICAL COMMUNICATION SYSTEM

(71) Applicant: FURUKAWA ELECTRIC CO., LTD., Tokyo (JP)

(72) Inventors: Shigehiro Takasaka, Tokyo (JP); Koichi Maeda, Tokyo (JP); Ryuichi Sugizaki, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 188 days.

(21) Appl. No.: 17/931,732

(22) Filed: Sep. 13, 2022

(65) Prior Publication Data
US 2023/0003934 A1  Jan. 5, 2023

Related U.S. Application Data

(63) Continuation of application No. PCT/JP2021/009354, filed on Mar. 9, 2021.

(30) Foreign Application Priority Data

Mar. 30, 2020  (JP) ................................. 2020-060718

(51) Int. Cl.
*G02B 6/02* (2006.01)
*G02B 6/036* (2006.01)
(Continued)

(52) U.S. Cl.
CPC ..... *G02B 6/02042* (2013.01); *G02B 6/03616* (2013.01); *G02B 6/04* (2013.01); *H01S 3/094007* (2013.01)

(58) Field of Classification Search
None
See application file for complete search history.

(56) References Cited

U.S. PATENT DOCUMENTS

| 8,903,211 B2 | 12/2014 | Fini et al. |
| 2011/0279888 A1 | 11/2011 | Fini et al. |

(Continued)

FOREIGN PATENT DOCUMENTS

| JP | 2013-522914 A | 6/2013 |
| JP | 2014-96398 A | 5/2014 |

(Continued)

OTHER PUBLICATIONS

Office Action issued Aug. 1, 2023, in corresponding Japanese Patent Application No. 2020-060718 (with English Translation), 10 pages.

(Continued)

*Primary Examiner* — Jerry Rahll
(74) *Attorney, Agent, or Firm* — Oblon, McClelland, Maier & Neustadt, L.L.P.

(57) ABSTRACT

A multi-core optical amplifying fiber includes: core portions doped with a rare-earth element; an inner cladding portion; and an outer cladding portion. A mode field diameter of each core portion at a wavelength at which the rare-earth element performs optical amplification is 5 μm to 11 μm, a relative refractive-index difference of the maximum refractive index of each core portion with respect to the inner cladding portion is 0.35% to 2%, a core-to-core distance is set such that total inter-core crosstalk is −40 dB/100 m or lower in an optical amplification wavelength band subjected to the optical amplification, a cladding thickness is smaller than a value obtained by adding the mode field diameter to a minimum value of the core-to-core distance, and a ratio of a total sectional area of the core portions to a sectional area of the inner cladding portion is 1.9% or more.

13 Claims, 5 Drawing Sheets

(51) Int. Cl.
  *G02B 6/04* (2006.01)
  *H01S 3/094* (2006.01)

(56) References Cited

U.S. PATENT DOCUMENTS

| | | |
|---|---|---|
| 2014/0240819 A1 | 8/2014 | Tsuchida et al. |
| 2015/0086199 A1 | 3/2015 | Ryf et al. |
| 2015/0168642 A1* | 6/2015 | Mimura ............ H01S 3/094007 385/33 |
| 2015/0318659 A1* | 11/2015 | Matsuo ................. G02B 6/036 385/127 |
| 2019/0115715 A1* | 4/2019 | Hasegawa ............. H01S 3/0941 |
| 2020/0301066 A1* | 9/2020 | Takasaka ............. G02B 6/0288 |
| 2021/0296847 A1 | 9/2021 | Mizuno et al. |

FOREIGN PATENT DOCUMENTS

| | | |
|---|---|---|
| JP | 2017-183564 A | 10/2017 |
| JP | 2019-152866 A | 9/2019 |
| JP | 2020-9999 A | 1/2020 |
| WO | WO 2013/051655 A1 | 4/2013 |

OTHER PUBLICATIONS

International Search Report issued May 25, 2021, in PCT/JP2021/009354, filed on Mar. 9, 2021, 3 pages.
Abedin et al., "Multicore Erbium Doped Fiber Amplifiers for Space Division Multiplexing Systems", Journal of Lightwave Technology, vol. 32, No. 16, Aug. 15, 2014, 9 Pages.
Abedin et al., "Cladding-pumped erbium-doped multicore fiber amplifier", Optics Express vol. 20, No. 18, Aug. 27, 2012, 10 Pages.

* cited by examiner

MULTI-CORE OPTICAL AMPLIFYING FIBER, MULTI-CORE OPTICAL FIBER AMPLIFIER, AND OPTICAL COMMUNICATION SYSTEM

This application is a continuation of International Application No. PCT/JP2021/009354, filed on Mar. 9, 2021 which claims the benefit of priority of the prior Japanese Patent Application No. 2020-060718, filed on Mar. 30, 2020, the entire contents of which are incorporated herein by reference.

BACKGROUND

The present disclosure relates to a multi-core optical amplifying fiber, a multi-core optical fiber amplifier, and an optical communication system.

In undersea optical communications, for example, the use of a multi-core EDFA (erbium-doped optical fiber amplifier) as an optical amplifier is expected to reduce the power consumption of the optical amplifier.

Widely known is a multi-core EDFA obtained by using a double-cladding multi-core EDF as a multi-core optical amplifying fiber and photoexciting erbium (Er) serving as a rare-earth element included in the core portions by a cladding pumping system (refer to Kazi S Abedin et al., "Multimode Erbium Doped Fiber Amplifiers for Space Division Multiplexing Systems", JOURNAL OF LIGHTWAVE TECHNOLOGY, VOL. 32, NO. 16, Aug. 15, 2014 pp. 2800-2808, and Kazi S Abedin et al., "Cladding-pumped erbium-doped multicore fiber amplifier", OPTICS EXPRESS Vol. 20, No. 18 27 Aug. 2012 pp. 20191-20200). Typically, the length of the multi-core EDF used for the multi-core EDFA is approximately 100 m or shorter.

SUMMARY

Multi-core optical amplifying fibers need to have more suitable characteristics to increase the communication capacity because communication traffic is constantly increasing.

In particular, it is preferable to improve the excitation efficiency of multi-core optical amplifying fibers from the viewpoint of reducing the power consumption of multi-core optical fiber amplifiers. The excitation efficiency is expressed, for example, by the ratio of the energy of pumping light used for optical amplification to the energy of pumping light input to a multi-core optical amplifying fiber.

There is a need for a multi-core optical amplifying fiber with improved excitation efficiency, and a multi-core optical fiber amplifier and an optical communication system using the multi-core optical amplifying fiber.

According to one aspect of the present disclosure, there is provided a multi-core optical amplifying fiber including: a plurality of core portions doped with a rare-earth element; an inner cladding portion surrounding the core portions and having a refractive index lower than a maximum refractive index of the core portions; and an outer cladding portion surrounding the inner cladding portion and having a refractive index lower than the refractive index of the inner cladding portion, wherein a mode field diameter of each of the core portions at a wavelength at which the rare-earth element performs optical amplification is 5 μm to 11 μm, a relative refractive-index difference of the maximum refractive index of each of the core portions with respect to the inner cladding portion is 0.35% to 2%, a core-to-core distance that is a separation distance between centers of the respective core portions on a section perpendicular to a longitudinal direction is set such that total inter-core crosstalk is −40 dB/100 m or lower in an optical amplification wavelength band subjected to the optical amplification, a cladding thickness that is a distance from a center of a core portion closest to an outer end of the inner cladding portion out of the core portions to the outer end is smaller than a value obtained by adding the mode field diameter to a minimum value of the core-to-core distance, and a ratio of a total sectional area of the plurality of core portions to a sectional area of the inner cladding portion is 1.9% or more.

DETAILED DESCRIPTION

Figure 1:
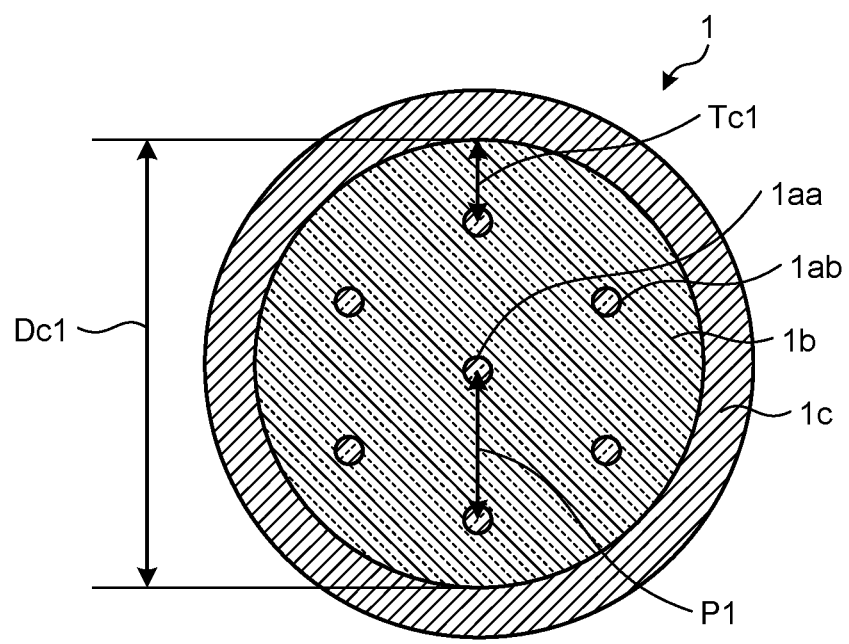
FIG. 1 is a schematic sectional view of a multi-core optical amplifying fiber according to a first embodiment.

Embodiments are described below with reference to the accompanying drawings. The embodiments are not intended to limit the present disclosure. In the drawings, identical or corresponding elements are approximately denoted by like reference numerals. It should be noted that the drawings are schematics and that the dimensional relation and the ratio between the elements, for example, may possibly be different from those in an actual configuration. The drawings may possibly include parts different from each other in the dimensional relation and the ratio. In the present specification, cutoff wavelength means the cable cutoff wavelength defined in ITU-T (International Telecommunication Union) G.650.1. Other terms not specifically defined in the present specification follows the definitions and the measurement methods in G.650.1 and G.650.2.

FIG. 1 is a schematic sectional view of a multi-core optical amplifying fiber according to a first embodiment and illustrates a cross-section perpendicular to the longitudinal direction of the multi-core optical amplifying fiber. A multi-core optical amplifying fiber 1 is a double-cladding and seven-core multi-core optical fiber including seven core portions 1aa and 1ab, an inner cladding portion 1b surrounding the core portions 1aa and 1ab, and an outer cladding portion 1c surrounding the inner cladding portion 1b.

The core portions 1aa and 1ab are arranged in a triangular lattice that achieves the close-packed state. The core portion 1aa is disposed at or near the center of the inner cladding portion 1b. Six core portions 1ab are disposed around the core portion 1aa so as to be positioned at the corners of a regular hexagon. The core portions 1aa and 1ab contain germanium (Ge) and/or aluminum (Al), for example, as dopant for adjusting the refractive index that increases the refractive index. The core portions 1aa and 1ab also contain Er as a rare-earth element serving an amplifying medium. Er is added at such a concentration that the peak of the absorption coefficient at a wavelength of approximately 1530 nm is 2.5 dB/m to 11 dB/m, for example. The addition concentration is 250 ppm to 2000 ppm, for example. The absorption coefficient and the addition concentration, however, are not particularly limited. Al also has the function of suppressing concentration quenching of Er.

The inner cladding portion 1b has a refractive index lower than the maximum refractive index of the core portions 1aa and 1ab. The inner cladding portion 1b is made of pure quartz glass containing no dopant for adjusting the refractive index, for example. As a result, the refractive index profile of the core portions 1aa and 1ab and the inner cladding portion 1b is a step-index type. The inner cladding portion 1b may have trench portions positioned on the outer peripheries of the core portions 1aa and 1ab. In this case, the trench portion is made of quartz glass doped with dopant for adjusting the refractive index, such as fluorine (F), that decreases the refractive index, and the refractive index of the trench portion is lower than that of the other part of the inner cladding portion 1b made of pure quartz glass. In this case, the refractive index profile of the core portions 1aa and 1ab and the inner cladding portion 1b is a trench type.

The relative refractive-index difference of the maximum refractive index of each of the core portions 1aa and 1ab with respect to the inner cladding portion 1b is referred to as a core $\Delta$. The cores $\Delta$ of the core portions 1aa and 1ab according to the present embodiment are substantially equal and are 0.35% to 2% at a wavelength of 1550 nm, for example. The core diameter of the core portions 1aa and 1ab is preferably set so as to achieve a cutoff wavelength shorter than the optical amplification wavelength band in which the rare-earth element can perform optical amplification in relation to the core $\Delta$. In the case of Er, the optical amplification wavelength band in which the rare-earth element can perform optical amplification is a band called a C-band of 1530 nm to 1565 nm, for example, and a band called an L-band of 1565 nm to 1625 nm, for example. The mode field diameter of the core portions 1aa and 1ab at the wavelength at which Er performs optical amplification, specifically at 1550 nm, is 5 μm to 11 μm, for example.

The outer cladding portion 1c has a refractive index lower than that of the inner cladding portion 1b and is made of resin, for example. If the inner cladding portion 1b has the trench portions, the refractive index of the outer cladding portion 1c may be higher than that of the trench portion but is lower than that of the other part of the inner cladding portion 1b and the average refractive index of the inner cladding portion 1b.

The separation distance between the respective centers of the core portions 1aa and 1ab on the section illustrated in FIG. 1 is referred to as a core-to-core distance P1. The core-to-core distance P1 corresponds to the length of one side of the triangular lattice. The outer diameter (cladding diameter) of the inner cladding portion 1b is referred to as a cladding diameter Dc1. The core portion closest to the outer end of the inner cladding portion 1b out of the core portions 1aa and 1ab is any one of the six core portions 1ab. In the present embodiment, all the six core portions 1ab are equidistant from the outer end of the inner cladding portion 1b. The shortest distance from the center of any one of the six core portions 1ab to the outer end of the inner cladding portion 1b is referred to as a cladding thickness Tc1.

When pumping light at a wavelength capable of photoexciting Er, that is, pumping light in a wavelength band of 900 nm, specifically at 976 nm, for example, is input to the inner cladding portion 1b, it photoexcites Er added to the core portions 1aa and 1ab while propagating in the inner cladding portion 1b. As a result, the core portions 1aa and 1ab can optically amplify a light signal input to the core portions 1aa and 1ab. As described above, the multi-core optical amplifying fiber 1 is configured to be able to employ the cladding pumping system.

In the multi-core optical amplifying fiber 1, the core-to-core distance P1 is set such that the total inter-core crosstalk is −40 dB/100 m or lower in the optical amplification wavelength band. When a light signal with a predetermined power is input and propagated through the core portions 1aa and 1ab, and part of the power of the light signal leaks to another core portion, the total inter-core crosstalk is defined as the following Expression (1), for example.

$$(\text{Total Inter} - \text{Core Crosstalk}) = \sum_l \frac{(\text{Power of Signal Light Leaking from Core } l \text{ to Core } k)}{(\text{Power of Signal Light Input to Core } l)} \quad (1)$$

where core l is all the adjacent cores surrounding core k. In the case of a seven-core fiber with a hexagonal close-packed structure, the core k is the central core. In the case of a 19-core fiber with a hexagonal close-packed structure, the core k is any one of the central core and the six adjacent cores surrounding the central core. In the case of structures other than the hexagonal close-packed structure, the core having the largest number of adjacent cores is selected as the core k.

In the multi-core optical amplifying fiber 1, the cladding thickness Tc1 is smaller than a value obtained by adding the mode field diameter to the minimum value of the core-to-core distance P1. In the multi-core optical amplifying fiber 1, the cladding thickness Tc1 is smaller than a value obtained by adding the mode field diameter to the core-to-core distance P1 because the core-to-core distance P1 is equal for all the core portions.

In the multi-core optical amplifying fiber 1 configured as described above, the total inter-core crosstalk is −40 dB/100 m or lower in the optical amplification wavelength band. Thus, the multi-core optical amplifying fiber 1 suppresses inter-core crosstalk to such an extent that it is suitably used for a multi-core optical fiber amplifier used in an optical communication system the transmission distance of which is approximately 100 km or smaller, for example. An example of such an optical communication system is a metro network system.

If the total inter-core crosstalk is −50 dB/100 m or lower in the optical amplification wavelength band in the multi-core optical amplifying fiber 1, the multi-core optical amplifying fiber 1 suppresses inter-core crosstalk to such an extent that it is suitably used for a multi-core optical fiber amplifier used in an optical communication system the transmission distance of which is approximately 1000 km or smaller, for example. An example of such an optical communication system is a land long-distance communication system.

If the total inter-core crosstalk is −60 dB/100 m or lower in the optical amplification wavelength band in the multi-core optical amplifying fiber 1, the multi-core optical amplifying fiber 1 suppresses inter-core crosstalk to such an extent that it is suitably used for a multi-core optical fiber amplifier used in an optical communication system the transmission distance of which is approximately 6000 km or larger, for example. An example of such an optical communication system is a long-distance communication system on land or undersea.

In communication systems, optical fiber transmission lines are long, and the number of repeaters increases with the transmission distance. As a result, crosstalk in each of the optical elements inserted in the optical fiber transmission line accumulates and affects the communication quality. For this reason, the multi-core optical amplifying fiber 1 for a multi-core optical fiber amplifier used in an optical communication system preferably has smaller total inter-core crosstalk in the optical amplification wavelength band.

In the multi-core optical amplifying fiber 1, the cladding thickness Tc1 is smaller than a value obtained by adding the mode field diameter to the minimum value of the core-to-core distance P1. With this configuration, the sectional area of the inner cladding portion 1b can be made relatively small. Thus, the optical power density of pumping light in the inner cladding portion 1b is relatively high when the pumping light is input to the inner cladding portion 1b. As a result, the excitation efficiency is improved in the multi-core optical amplifying fiber 1. In addition, the saturated output power, for example, obtained in the multi-core optical amplifying fiber 1 increases.

If the cladding thickness Tc is equal to or larger than the mode field diameter, 99% or more of the power in the power distribution of light signal propagating through the core portion 1ab does not reach the interface between the inner cladding portion 1b and the outer cladding portion 1c. As a result, the effect of the interface on propagation of light signal can be suppressed. In addition, the cladding thickness Tc1 is smaller than a value obtained by adding the mode field diameter to the minimum value of the core-to-core distance P1. Thus, the multi-core optical amplifying fiber 1 can include the largest number of core portions that can secure the core-to-core distance P1 and increase the optical power density of pumping light. If the cladding thickness Tc1 is equal to or larger than the value obtained by adding the mode field diameter to the minimum value of the core-to-core distance P1, core portions may be added to the part closer to the outer cladding portion 1c than the core portions 1ab while maintaining the core-to-core distance P1. As a result, the cladding thickness defined with respect to the added core portions is smaller than the value obtained by adding the mode field diameter to the core-to-core distance P1.

Figure 2A:
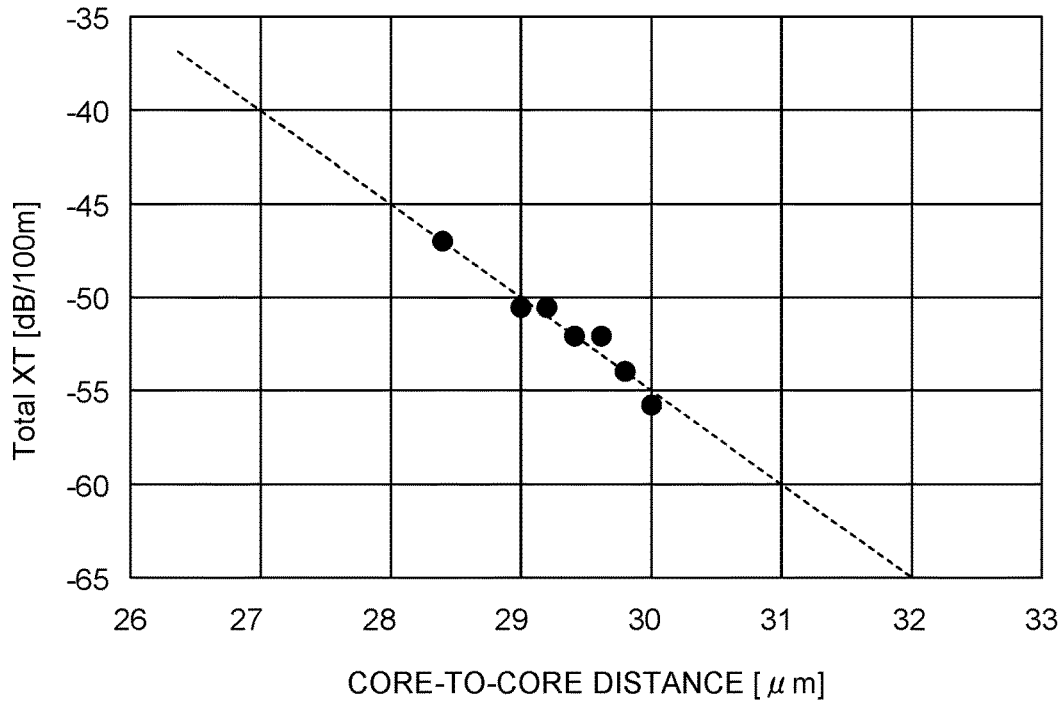
FIG. 2A is a diagram illustrating an example of the relation between core-to-core distance and total crosstalk (Total XT)

FIG. 2A is a diagram illustrating an example of the relation between the core-to-core distance P1 and the total crosstalk (Total XT). FIG. 2A is obtained by performing a simulation calculation using the finite element method on the multi-core optical amplifying fiber with the seven-core configuration illustrated in FIG. 1. The calculation conditions are as follows: the refractive index profile of each core portion is the index type, the core Δ is set to 1.1%, and the mode field diameter is set to 5.8 μm.

In FIG. 2A, the black dots are data points obtained by the calculation, and the dotted line is a line obtained by linearly approximating the data points. As illustrated in FIG. 2A, a Total XT of −40 dB/100 m or lower was obtained when the core-to-core distance P1 was 27 μm or larger under the calculation conditions described above. A Total XT of −50 dB/100 m or lower was obtained when the core-to-core distance P1 was 29 μm or larger. A Total XT of −60 dB/100 m or lower was obtained when the core-to-core distance P1 was 31 μm or larger.

Figure 2B:
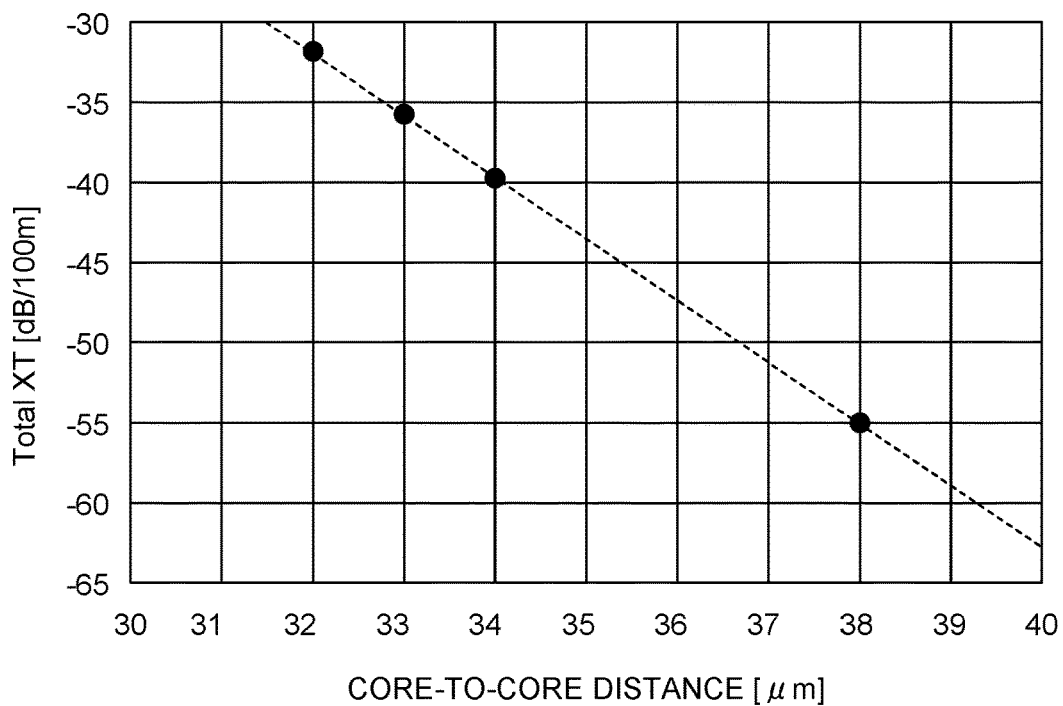
FIG. 2B is a diagram illustrating another example of the relation between core-to-core distance and total crosstalk (Total XT)

FIG. 2B is a diagram illustrating another example of the relation between the core-to-core distance P1 and the total crosstalk (Total XT). FIG. 2B is obtained by performing a simulation calculation using the finite element method on the multi-core optical amplifying fiber with the seven-core configuration illustrated in FIG. 1. The calculation conditions are as follows: the refractive index profile of each core portion is the index type, the core Δ is set to 0.8%, and the mode field diameter is set to 6.7 μm.

In FIG. 2B, the black dots are data points obtained by the calculation, and the dotted line is a line obtained by linearly approximating the data points. As illustrated in FIG. 2B, a Total XT of −40 dB/100 m or lower was obtained when the core-to-core distance P1 was 34 μm or larger under the calculation conditions described above. A Total XT of −50 dB/100 m or lower was obtained when the core-to-core distance P1 was 37 μm or larger. A Total XT of −60 dB/100 m or lower was obtained when the core-to-core distance P1 was 40 μm or larger.

When the core-to-core distance P1 is 27 μm, the value of the cladding thickness Tc1 satisfying the condition of being smaller than a value obtained by adding a mode field diameter of 5.8 μm to the minimum value of the core-to-core distance P1 is 32 μm or smaller, for example, which is smaller than 32.8 μm. When the core-to-core distance P1 is 29 μm, the value of the cladding thickness Tc1 is 34 μm or smaller, for example, which is smaller than 34.8 μm. When the core-to-core distance P1 is 31 μm, the value of the cladding thickness Tc1 is 36 μm or smaller, for example, which is smaller than 36.8 μm.

The cladding thickness Tc1 is not limited thereto. A cladding thickness Tc1 of 50 μm or smaller, for example, can achieve the advantageous effect of improving the excitation efficiency.

We calculated the total area (cladding area) of the core portions and the inner cladding portion of a multi-core optical amplifying fiber according to a first comparative example that was a seven-core fiber like the one illustrated in FIG. 1 but having a core-to-core distance of 38.5 μm, a cladding thickness of 29 μm, and a cladding diameter of 135 μm. By contrast, we calculated the cladding area of the multi-core optical amplifying fiber 1 according to the first embodiment having a cladding thickness Tc1 of 23 μm and a core-to-core distance P1 of 29 μm. Comparing these calculation results, the cladding area according to the first embodiment was 59.3% of the cladding area according to the first comparative example and was significantly smaller than that according to the first comparative example. This means that the cladding area according to the first embodiment is reduced by 2.2 dB with respect to the cladding area according to the first comparative example, thereby improving the excitation efficiency.

The ratio of the total sectional area of the core portions 1aa and 1ab to the sectional area of the inner cladding portion 1b on the cross-section perpendicular to the longitudinal direction of the multi-core optical amplifying fiber 1 (hereinafter, which may be referred to as the core/cladding area ratio) was 1.9%. When the core/cladding area ratio is relatively large, a proportion of the power of pumping light contributing to optical amplification in the core portions 1aa and 1ab increases, thereby improving the excitation efficiency.

The total inter-core crosstalk according to the first comparative example was calculated to be −86 dB/100 m. By contrast, the total inter-core crosstalk according to the first embodiment was −50 dB/100 m. The first embodiment can achieve both practical total inter-core crosstalk and an improved excitation efficiency.

Figure 3:
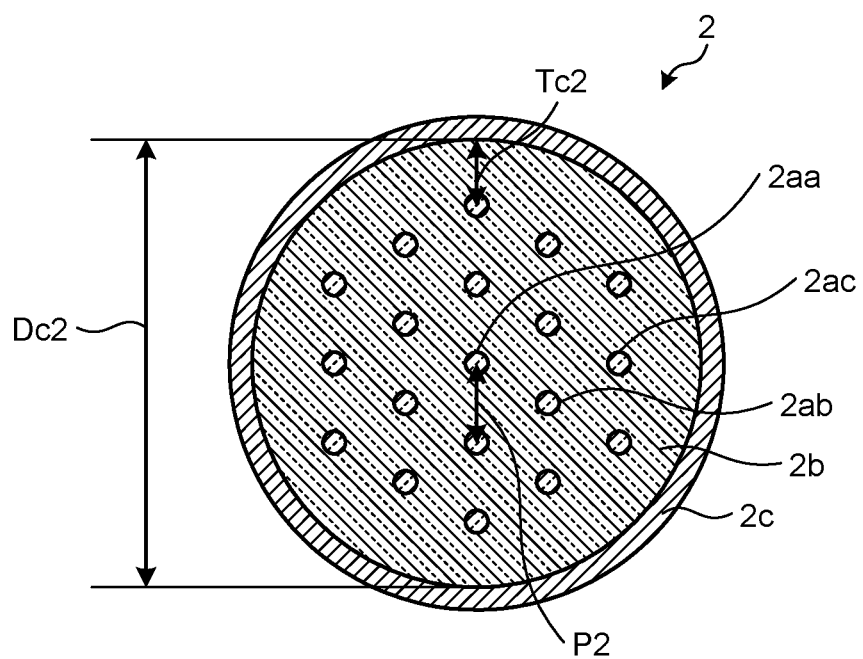
FIG. 3 is a schematic sectional view of the multi-core optical amplifying fiber according to a second embodiment.

FIG. 3 is a schematic sectional view of the multi-core optical amplifying fiber according to a second embodiment and illustrates a cross-section perpendicular to the longitudinal direction of the multi-core optical amplifying fiber. A multi-core optical amplifying fiber 2 is a double-cladding and 19-core multi-core optical fiber including 19 core portions 2aa, 2ab, and 2ac, an inner cladding portion 2b surrounding the core portions 2aa, 2ab, and 2ac, and an outer cladding portion 2c surrounding the inner cladding portion 2b.

The core portions 2aa, 2ab, and 2ac are arranged in a triangular lattice that achieves the close-packed state. The core portion 2aa is disposed at or near the center of the inner cladding portion 2b. Six core portions 2ab are disposed around the core portion 2aa so as to be positioned at the corners of a regular hexagon. 12 core portions 2ac are disposed around the core portions 2ab so as to be positioned at the corners or the centers of the sides of a regular hexagon. Explanation of the composition and the refractive index of the core portions 2aa, 2ab, and 2ac is omitted because they are similar to those of the core portions 1aa and 1ab of the multi-core optical amplifying fiber 1.

Explanation of the composition and the refractive index of the inner cladding portion 2b is omitted because they are similar to those of the inner cladding portion 1b. While the refractive index profile of the core portions 2aa, 2ab, and 2ac and the inner cladding portion 2b is a step-index type, it may be a trench type. Explanation of the composition and the refractive index of the outer cladding portion 2c is omitted because they are similar to those of the outer cladding portion 1c.

The core-to-core distance between the core portions 2aa, 2ab, and 2ac on the section illustrated in FIG. 3 is referred to as a core-to-core distance P2. The cladding diameter of the inner cladding portion 2b is referred to as a cladding diameter Dc2. The core portion closest to the outer end of the inner cladding portion 2b out of the core portions 2aa, 2ab, and 2ac is any one of the six core portions 2ac positioned at the corners of the regular hexagon out of the 12 core portions 2ac. In the present embodiment, all the six core portions 2ac are equidistant from the outer end of the inner cladding portion 2b. The shortest distance from the center of any one of the six core portions 2ac to the outer end of the inner cladding portion 2b is referred to as a cladding thickness Tc2.

When pumping light at a wavelength capable of photoexciting Er is input to the inner cladding portion 2b, it photoexcites Er added to the core portions 2aa, 2ab, and 2ac while propagating in the inner cladding portion 2b. As a result, the core portions 2aa, 2ab, and 2ac can optically amplify a light signal input to the core portions 2aa, 2ab, and 2ac. As described above, the multi-core optical amplifying fiber 2 is configured to be able to employ the cladding pumping system.

In the multi-core optical amplifying fiber 2, the core-to-core distance P2 is set such that the total inter-core crosstalk is −40 dB/100 m or lower in the optical amplification wavelength band similarly to the multi-core optical amplifying fiber 1. In the multi-core optical amplifying fiber 2, the cladding thickness Tc2 is smaller than a value obtained by adding the mode field diameter to the minimum value of the core-to-core distance P2. In the multi-core optical amplifying fiber 2, the cladding thickness Tc2 is smaller than a value obtained by adding the mode field diameter to the core-to-core distance P2 because the core-to-core distance P2 is equal for all the core portions.

The multi-core optical amplifying fiber 2 configured as described above suppresses inter-core crosstalk to an extent corresponding to the transmission distance of the optical communication system and improves the excitation efficiency. In addition, the saturated output power, for example, obtained in the multi-core optical amplifying fiber 2 increases.

For example, the inter-core crosstalk in the multi-core optical amplifying fiber 2 can be set to −50 dB/100 m or lower or −60 dB/100 m or lower. When the core-to-core distance P2 is 27 μm, the cladding thickness Tc2 can be set to 32 μm or smaller, for example, which is smaller than 32.8 μm. When the core-to-core distance P2 is 29 μm, the cladding thickness Tc2 can be set to 34 μm or smaller, for example, which is smaller than 34.8 μm. When the core-to-core distance P2 is 31 μm, the cladding thickness Tc2 can be set to 36 μm or smaller, for example, which is smaller than 36.8 μm. The cladding thickness Tc2 may be 50 μm or smaller.

We calculated the cladding area of a multi-core optical amplifying fiber according to a second comparative example that was a 19-core fiber like the one illustrated in FIG. 3 but having a core-to-core distance of 38.5 μm, a cladding thickness of 23 μm, and a cladding diameter of 200 μm. By contrast, we calculated the cladding area of the multi-core optical amplifying fiber 2 according to the second embodiment having a cladding thickness Tc2 of 23 μm and a core-to-core distance P2 of 29 μm. Comparing these calculation results, the cladding area according to the second embodiment was 65.6% of the cladding area according to the second comparative example and was significantly smaller than that according to the second comparative example. This means that the cladding area according to the second embodiment is reduced by 1.8 dB with respect to the cladding area according to the second comparative example, thereby improving the excitation efficiency.

The core/cladding area ratio of the multi-core optical amplifying fiber 2 is a relatively large value of 2.4%, thereby improving the excitation efficiency.

Similarly to the first embodiment, the second embodiment can achieve both practical total inter-core crosstalk and an improved excitation efficiency.

Figure 4:
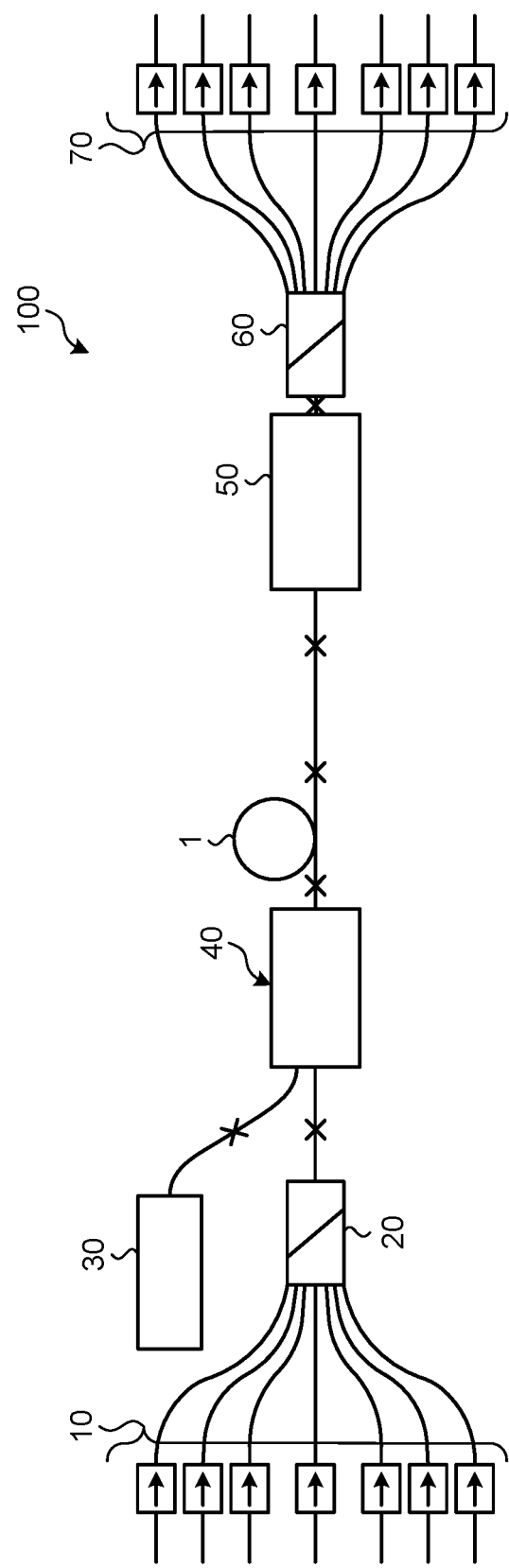
FIG. 4 is a schematic of the configuration of a multi-core optical fiber amplifier according to a third embodiment.

FIG. 4 is a schematic of the configuration of a multi-core optical fiber amplifier according to a third embodiment. In the following description, the multi-core optical fiber amplifier may be simply referred to as an optical amplifier. An optical amplifier 100 includes seven optical isolators 10, an optical fiber fan-in (FAN IN) 20, a semiconductor laser 30, an optical coupler 40, the multi-core optical amplifying fiber 1 according to the first embodiment, a pump stripper 50, an optical fiber fan-out (FAN OUT) 60, and seven optical isolators 70. The symbols "x" in the figure refer to fusion splicing points of the optical fiber.

The optical fiber fan-in 20 includes seven bundled single-mode optical fibers and one multi-core fiber including seven core portions. In the optical fiber fan-in 20, the core portions of the seven single-mode optical fibers are optically coupled to the respective core portions of the multi-core fiber at coupling portions. The seven single-mode optical fibers are standard single-mode optical fibers defined in ITU-TG.652, for example, and are each provided with the optical isolator 10. The optical isolators 10 and 70 allow light to pass therethrough in the direction indicated by the arrow and prevent light from passing therethrough in the opposite direction. The multi-core fiber of the optical fiber fan-in 20 is connected to the optical coupler 40. While the end surfaces of the seven bundled single-mode optical fibers and the multi-core fiber at which they are optically coupled are obliquely processed with respect to the optical axis to suppress reflection, they may be perpendicular to the optical axis. Instead of the seven optical isolators 10 and 70, an optical isolator in which a plurality of (seven in the present embodiment) single-mode optical fibers are integrated may be used.

Similarly to the multi-core optical amplifying fiber 1, the multi-core fiber of the optical fiber fan-in 20 includes seven core portions and a cladding portion. The seven core portions are arranged in a triangular lattice. The cladding portion is positioned on the outer periphery of the core portions and has a refractive index lower than the maximum refractive index of the core portions. When a light signal is input to the single-mode optical fibers of the optical fiber fan-in 20, each optical isolator 10 causes the light signal to pass therethrough, and each core portion of the multi-core fiber propagates the light signal.

The semiconductor laser 30 serving as a pumping light source is a lateral multi-mode semiconductor laser and outputs pumping light. The wavelength of the pumping light is 976 nm, which is substantially equal to the wavelength of the absorption peak of Er in the 900 nm wavelength band. As a result, the pumping light can photoexcite erbium ions. The semiconductor laser 30 outputs the pumping light from a multi-mode optical fiber. The multi-mode optical fiber is a step-index fiber with a core diameter/cladding diameter of 105 µm/125 µm, for example, and NA is 0.16 or 0.22, for example.

The optical coupler 40 includes a main optical fiber and an optical fiber for supplying pumping light. The main optical fiber is a double-cladding optical fiber including seven core portions, an inner cladding portion, and an outer cladding portion. The seven core portions are arranged in a triangular lattice similarly to the core portions of the multi-core fiber of the optical fiber fan-in 20. The inner cladding portion is positioned on the outer periphery of the core portions and has a refractive index lower than the maximum refractive index of the core portions. The outer cladding portion is positioned on the outer periphery of the inner cladding portion and has a refractive index lower than that of the inner cladding portion. The core portions and the inner cladding portion are made of quartz-based glass, and the outer cladding portion is made of resin.

The optical fiber for supplying pumping light is a multi-mode optical fiber of the same type with another end connected to the multi-mode optical fiber of the semiconductor laser 30. The optical fiber for supplying pumping light is a step-index fiber with a core diameter/cladding diameter of 105 µm/125 µm, for example, and NA is 0.16 or 0.22, for example. The optical fiber for supplying pumping light receives pumping light from the semiconductor laser 30 and supplies the pumping light to the main optical fiber. The inner cladding portion propagates the pumping light.

One end of the main optical fiber of the optical coupler 40 is connected to the multi-core fiber of the optical fiber fan-in 20. The core portions of the multi-core fiber are connected to the respective core portions of the main optical fiber. Therefore, a light signal propagating through each core portion of the multi-core fiber enters the main optical fiber and is optically coupled to each core portion. Each core portion propagates the light signal. The pumping light and the light signal are output from the main optical fiber to the multi-core optical amplifying fiber 1.

One end of the multi-core optical amplifying fiber 1 is connected to the main optical fiber of the optical coupler 40. Core portions 1*a* of the multi-core optical amplifying fiber 1 are connected to the respective core portions of the main optical fiber. The inner cladding portion 1*b* of the multi-core optical amplifying fiber 1 is connected to the inner cladding portion of the main optical fiber. Therefore, the light signal and the pumping light propagating through the main optical fiber enter the multi-core optical amplifying fiber 1 and propagate in the same direction through the core portions 1*a* and the inner cladding portion 1*b*, respectively. The pumping light photoexcites Er in the core portions 1*a* while propagating through the inner cladding portion 1*b*. The light signal propagating through each core portion 1*a* is optically amplified by the action of stimulated emission of Er. The multi-core optical amplifying fiber 1 outputs the optically amplified light signal and the pumping light not contributing to optical amplification.

The pump stripper 50 is a known device that eliminates pumping light not contributing to optical amplification. The pump stripper 50 has a configuration obtained by removing part of the outer cladding portion of the double-cladding multi-core fiber including seven cores, for example. The pump stripper 50 extracts pumping light from the surface of the inner cladding portion corresponding to the removed part. The pump stripper 50 outputs the pumping light to a heat sink or the like and causes the heat sink to absorb it. Thus, the pump stripper 50 converts the energy of the pumping light into thermal energy and radiates heat. The pump stripper 50 propagates the light signal by the multi-core fiber and reduces the power of the pumping light to such a level that the pumping light causes no problem when it is output from the optical amplifier 100.

Similarly to the optical fiber fine-in 20, the optical fiber fan-out 60 includes seven bundled single-mode optical fibers and one multi-core fiber including seven core portions. In the optical fiber fan-out 60, the core portions of the seven single-mode optical fibers are optically coupled to the respective core portions of the multi-core fiber at coupling portions. Each single-mode optical fiber is provided with the optical isolator 70. The multi-core fiber is connected to the pump stripper 50. While the end surfaces of the seven bundled single-mode optical fibers and the multi-core fiber at which they are optically coupled are obliquely processed with respect to the optical axis to suppress reflection, they may be perpendicular to the optical axis.

When a light signal is input from each core portion of the multi-core fiber of the pump stripper 50 to each core portion of the optical fiber fan-out 60, the light signal propagates through the core portion of each single-mode optical fiber and is output through the optical isolator 70.

The optical amplifier 100 performs optical amplification using the multi-core optical amplifying fiber 1 with improved excitation efficiency, thus reducing the power consumption of the semiconductor laser 30 to obtain the same amplification characteristics.

Figure 5:
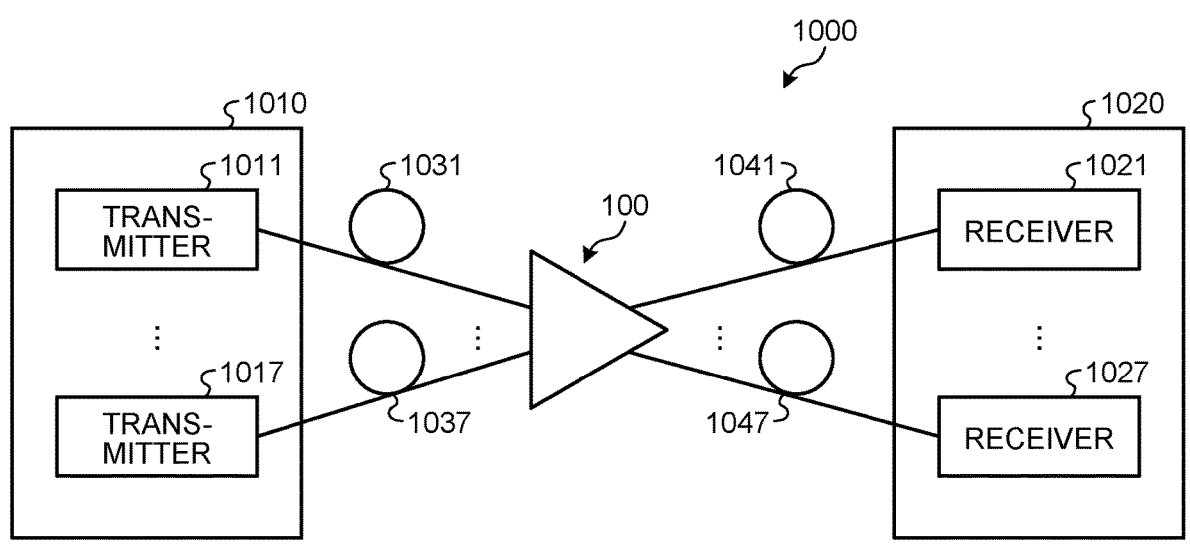
FIG. 5 is a schematic of the configuration of an optical communication system according to a fourth embodiment.

FIG. 5 is a schematic of the configuration of an optical communication system according to a fourth embodiment. An optical communication system 1000 includes an optical transmitting device 1010, an optical receiving device 1020, the optical amplifier 100 according to the third embodiment, and 14 optical transmission fibers 1031 to 1037 and 1041 to 1047 serving as single-core optical fibers.

The optical transmitting device 1010 includes seven transmitters 1011 to 1017. The transmitters 1011 to 1017 each transmit a light signal. The seven optical transmission fibers 1031 to 1037 transmit the light signals output from the transmitters 1011 to 1017, respectively, and input them to the optical amplifier 100. The optical amplifier 100 collectively optically amplifies the seven light signals received from the optical transmission fibers 1031 to 1037 and outputs them to the seven optical transmission fibers 1041 to 1047, respectively. The optical transmission fibers 1041 to 1047 transmit the amplified light signals and input them to the optical receiving device 1020. The optical receiving device 1020 includes seven receivers 1021 to 1027. The receivers 1021 to 1027 receive the amplified light signals transmitted by the optical transmission fibers 1041 to 1047 and convert them into electrical signals.

The optical communication system 1000 can achieve optical communications that requires less power consumption because it uses the optical amplifier 100 that requires less power consumption to obtain the same amplification characteristics. While the optical transmission fiber according to the present embodiment is seven single-core optical fibers, it may be an optical transmission fiber composed of one seven-core multi-core fiber.

If the optical communication system 1000 is a long-distance communication system or the like, the optical amplifier 100 can be used as a repeater amplifier, a preamplifier, or a booster amplifier. If the optical communication system 1000 is a network system or the like using ROADM (reconfigurable optical add/drop multiplexer), the optical amplifier 100 can be used for loss compensation.

While the core portions of the multi-core optical amplifying fiber according to the embodiments above contain only Er as the rare-earth element, they may contain only a rare-earth element other than Er, such as ytterbium (Yb), or both Er and Yb. If the core portions contain only Yb, the optical amplification wavelength band in which the rare-earth element can perform optical amplification is a wavelength band including 1064 nm, for example. If the core portions contain both Er and Yb, the optical amplification wavelength band in which the rare-earth element can perform optical amplification is the C-band and the L-band, for example. If the core portions contain praseodymium (Pr) and/or bismuth (Bi) as the rare-earth element, the optical amplification wavelength band in which the rare-earth element can perform optical amplification is a wavelength band including 1310 nm, for example. If the core portions contain thulium (Tm) as the rare-earth element, the optical amplification wavelength band in which the rare-earth element can perform optical amplification is a wavelength band including 1500 nm, for example.

While the core portions in the multi-core optical amplifying fiber according to the embodiments above are arranged in a triangular lattice, they may be arranged in a square lattice or a circular ring shape. The number of core portions in the multi-core optical amplifying fiber is not particularly limited as long as there are a plurality of core portions.

The embodiments above are not intended to limit the present disclosure. An aspect obtained by appropriately combining the components described above is also included in the present disclosure. The multi-core optical fiber amplifier as described in the third embodiment, for example, may be configured using the multi-core optical amplifying fiber 2 according to the second embodiment. Further advantageous effects and modifications can be easily derived by those skilled in the art. Thus, broader aspects of the present disclosure are not limited to the embodiments above, and various modifications can be made.

The present disclosure can be used for a multi-core optical amplifying fiber, a multi-core optical fiber amplifier, and an optical communication system.

The present disclosure can provide a multi-core optical amplifying fiber with improved excitation efficiency, and a multi-core optical fiber amplifier and an optical communication system using the multi-core optical amplifying fiber.

What is claimed is:

1. A multi-core optical amplifying fiber comprising:
   a plurality of core portions doped with a rare-earth element;
   an inner cladding portion surrounding the core portions and having a refractive index lower than a maximum refractive index of the core portions; and
   an outer cladding portion surrounding the inner cladding portion and having a refractive index lower than the refractive index of the inner cladding portion, wherein
   a mode field diameter of each of the core portions at a wavelength at which the rare-earth element performs optical amplification is 5 µm to 11 µm,
   a relative refractive-index difference of the maximum refractive index of each of the core portions with respect to the inner cladding portion is 0.35% to 2%,
   a core-to-core distance that is a separation distance between centers of the respective core portions on a section perpendicular to a longitudinal direction is set such that total inter-core crosstalk is −40 dB/100 m or lower in an optical amplification wavelength band subjected to the optical amplification,
   a cladding thickness that is a distance from a center of a core portion closest to an outer end of the inner cladding portion out of the core portions to the outer end is smaller than a value obtained by adding the mode field diameter to a minimum value of the core-to-core distance, and
   a ratio of a total sectional area of the plurality of core portions to a sectional area of the inner cladding portion is 1.9% or more.

2. The multi-core optical amplifying fiber according to claim 1, wherein the minimum value of the core-to-core distance is 27 µm or larger.

3. The multi-core optical amplifying fiber according to claim 1, wherein the core-to-core distance is set such that the total inter-core crosstalk is −50 dB/100 m or lower in the optical amplification wavelength band.

4. The multi-core optical amplifying fiber according to claim 3, wherein the minimum value of the core-to-core distance is 29 µm or larger.

5. The multi-core optical amplifying fiber according to claim 1, wherein the core-to-core distance is set such that the total inter-core crosstalk is −60 dB/100 m or lower in the optical amplification wavelength band.

6. The multi-core optical amplifying fiber according to claim 5, wherein the minimum value of the core-to-core distance is 31 µm or larger.

7. The multi-core optical amplifying fiber according to claim 1, wherein the cladding thickness is 10 µm or larger.

8. A multi-core optical fiber amplifier comprising:
   the multi-core optical amplifying fiber according to claim 1;
   a pumping light source configured to output pumping light for photoexciting the rare-earth element of the multi-core optical amplifying fiber; and
   an optical coupler configured to optically couple the pumping light to the inner cladding portion.

9. An optical communication system comprising the multi-core optical fiber amplifier according to claim 8.

10. The multi-core optical amplifying fiber according to claim 1, wherein the total inter-core crosstalk is defined as the following Expression $$\sum_l \frac{(\text{Power of Signal Light Leaking from Core } l \text{ to Core } k)}{(\text{Power of Signal Light Input to Core } l)}$$

where core l is all the adjacent cores surrounding core k.

11. The multi-core optical amplifying fiber according to claim 10, wherein the fiber is a seven-core fiber with a hexagonal close-packed structure and the core k is the central core.

12. The multi-core optical amplifying fiber according to claim 10, wherein the fiber is a 19-core fiber with a hexagonal close-packed structure and the core k is any one of the central core and the six adjacent cores surrounding the central core.

13. The multi-core optical amplifying fiber according to claim 10, wherein the fiber has a structure other than a hexagonal close-packed structure and the core having the largest number of adjacent cores is selected as the core k.

* * * * *